United States Patent [19]
Murray

[11] 3,764,756

[45] Oct. 9, 1973

[54] MAGNETIC HEAD ASSEMBLY WITH IRREGULARLY SHAPED APERTURE STRUCTURE

[75] Inventor: Joseph John Murray, Nesconset, N.Y.

[73] Assignee: Potter Instrument Company, Inc., Plainview, N.Y.

[22] Filed: Oct. 13, 1971

[21] Appl. No.: 188,910

[52] U.S. Cl. ...... 179/100.2 C, 29/603, 340/174.1 F

[51] Int. Cl. .......................... G11b 5/22, G11b 5/42

[58] Field of Search ............................ 179/100.2 C; 340/174.1 F; 346/74 MC

[56] References Cited

UNITED STATES PATENTS

| | | | |
|---|---|---|---|
| 3,577,191 | 5/1971 | Haertlein | 179/100.2 C |
| 3,501,756 | 3/1970 | Woods et al. | 340/174.1 F |
| 2,908,770 | 10/1959 | Warren | 179/100.2 C |
| 3,648,361 | 3/1972 | Yagi | 179/100.2 C |
| 3,543,396 | 12/1970 | Illg et al. | 179/100.2 C |
| 3,610,837 | 10/1971 | Brede | 179/100.2 |

*Primary Examiner*—Vincent P. Canney
*Assistant Examiner*—Alfred H. Eddleman
*Attorney*—Joseph M. Lane et al.

[57] ABSTRACT

In the manufacture of magnetic head assemblies, an irregularly shaped elongated aperture is formed in a nonmagnetic base to receive a magnetic core having a transducing gap. The aperture has a plurality of sidewalls which lie in two parallel planes spaced from each other by the width of the core, at least one portion of the aperture has a width, in a direction normal to the parallel planes, which is greater than the thickness of the core. The core is inserted between the sidewalls in the slot defined thereby, so that its gap is located in a portion of the aperture wider than the core. The remaining vacant portions of the aperture are filled with a transparent sealing composition which bonds the core to the base and permits a view of the mounted core. The base is then machined to reduce the gap to a predetermined critical height as determined by optical measurement.

13 Claims, 6 Drawing Figures

INVENTOR

JOSEPH J. MURRAY

INVENTOR
JOSEPH J. MURRAY

MAGNETIC HEAD ASSEMBLY WITH IRREGULARLY SHAPED APERTURE STRUCTURE

BACKGROUND OF THE INVENTION

The invention relates generally to the manufacture of magnetic head assemblies, and more particularly to improved means for positioning a magnetic transducing core in a slider or base of the type used in non-contact magnetic recording systems.

In non-contact magnetic storage systems, a transducer head or slider is mounted over a moving recording medium, such as a magnetic disc, at a small distance from the surface of the medium. The slider carries a thin, flat, U-shaped magnetic core, perpendicular to the surface of the medium, which senses the magnetic condition of the medium as the surface passes beneath the slider. With the need for high density and high frequency recording, the dimensions of the transducing gap in the core have been made progressively smaller. Due to inadequate manufacturing methods in the past, high yield production of the head assmebly has been difficult to attain because of the need for fine positioning of the delicate core in the slider and because of the criticality of the transducing gap height.

SUMMARY OF THE INVENTION

Accordingly, one of the objects of the invention is to provide an improved method of manufacturing magnetic head assemblies enabling precise positioning of the magnetic core in the slider. Another object of the invention is to enable optical viewing of the core after it is sealed in the slider. A further object of the invention is to provide means for reducing the height of the core gap to a predetermined critical height as determined by optical measurement.

These and other objects of the invention are achieved by providing a slider with a specially configured aperture in which a flat, U-shaped magnetic core is sealed in precise alignment by means of a transparent bonding material. The aperture is first formed in the slab-like slider by die stamping or chemical etching. The aperture has a plurality of sidewalls lying in two parallel planes defining a slot having a width equal to the thickness of the core. At least along a portion of one of the sidewalls, the aperture has a width, in a direction normal to the parallel planes, which is greater than the thickness of the core. In one embodiment, the aperture is generally in the shape of three serially arranged rectangular portions, the middle portion being offset from the other two, which are in axial alignment. One sidewall of the middle portion is spaced from the coplanar sidewalls of the end portions to precisely accommodate the width of the core. The core is inserted between these sidewalls which define its position by contacting the core at its ends on one side and its middle on the other side. The flat core is thus positioned exclusively by the length of the aperture and the nonfacing sidewalls on both sides of the core. The accuracy with which the walls can be formed in relation to each other is enhanced by virtue of the fact that the walls do not directly face each other.

To bond the core in position the remaining vacant portions of the aperture are filled with a sealing composition. The preferred technique is to introduce powdered glass or glass bars into these vacant portions. The entire assembly is then heated to the melting point of the sealing glass, at which point the glass flows, filling the vacant portions of the aperture and contacting the exposed sides of the core. After the glass is allowed to cool and solidify, the core is rigidly sealed in the slider, and portions of the core, including its transducing gap, are visible through the glass when viewed at appropriate angles. To complete the assembly, the surface of the slider which glides over the storage medium is abrasively ground or lapped. In the lapping process portions of the core are removed by machining the slider surface until the critical throat height of the gap in the core is determined by optical viewing to be correct for optimum magnetic response of the head assembly.

DETAILED DESCRIPTION OF THE PREFERRED EMBODIMENTS

The following procedure produces a magnetic head assembly, sometimes referred to as a head shoe, of the type presently used as a non-contact magnetic pick-up or transducer. For example, when used in connection with a magnetic storage disc, the assembly is typically mounted in a flexure on the end of a spring-loaded arm which selectively positions the head assembly in relation to the disc and maintains the assembly at a predetermined optimum "flying" height just above the disc surface. As the disc rotates continuously, supporting air pressure is built up and maintained by aerodynamic laminar flow beneath the assembly to form an air bearing. The adjacent side of the assembly is therefore called a "bearing surface."

Figure 1:
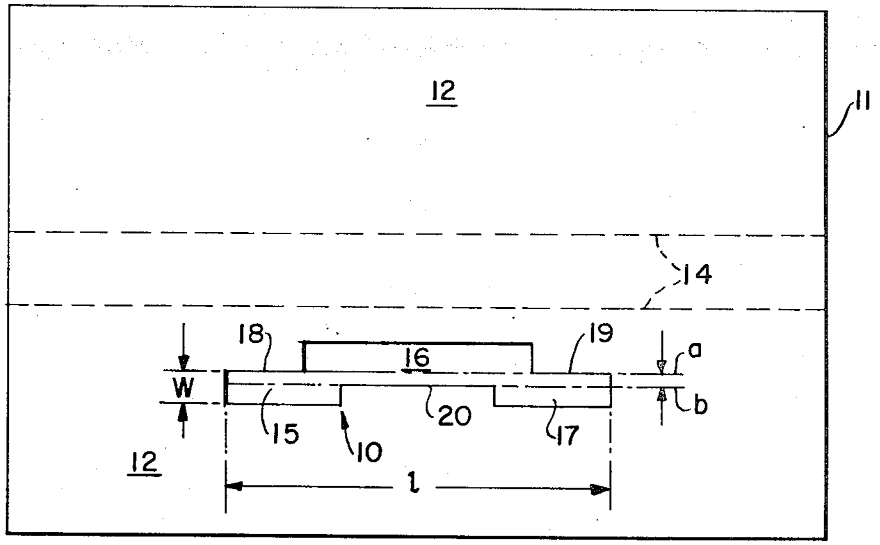
FIG. 1 is a plan view of a slider having an irregularly shaped aperture of preferred form according to the invention.

As shown in FIG. 1, an irregularly shaped aperture 10 is first formed by die stamping or chemical etching through a base or slider 11, which is ordinarily a rectangular slab of glass ceramic material, such as barium titanate or Photoceram (Trademark), having a coefficient of thermal expansion closely matching that of the core which the slider 11 will support. The slider 11 has an upper surface 12 and a lower surface or bearing surface 13 (not visible in FIG. 1) with an aerodynamic slot 14 which will be described later. The aperture 10 has a length, *l*, precisely equal to the length of the core; but the width, *w*, of the aperture 10 is much larger than the width of the core. The form of the aperture 10 can be thought of as a serial arrangement of three rectangular portions, 15, 16 and 17, the middle portion 16 being offset from the two end portions 15 and 17, which are axially aligned. The end portions have coplanar sidewalls 18 and 19 adjacent to the offset middle portion 16 of the aperture 10. The sidewalls 18 and 19 lie in a plane, designated by line *a*, perpendicular to the upper surface 12 of the slider 11. The middle portion 16 of the aperture 10 has a sidewall 20 lying in a plane, designated by line *b*, parallel to the plane of the sidewalls 18 and 19 but spaced therefrom by a distance, *d*, to accommodate the thickness of the core which is to be inserted. Although the three sidewalls 18, 19 and 20 do not directly face each other, the two planes in which they lie define a slot.

Figure 2:
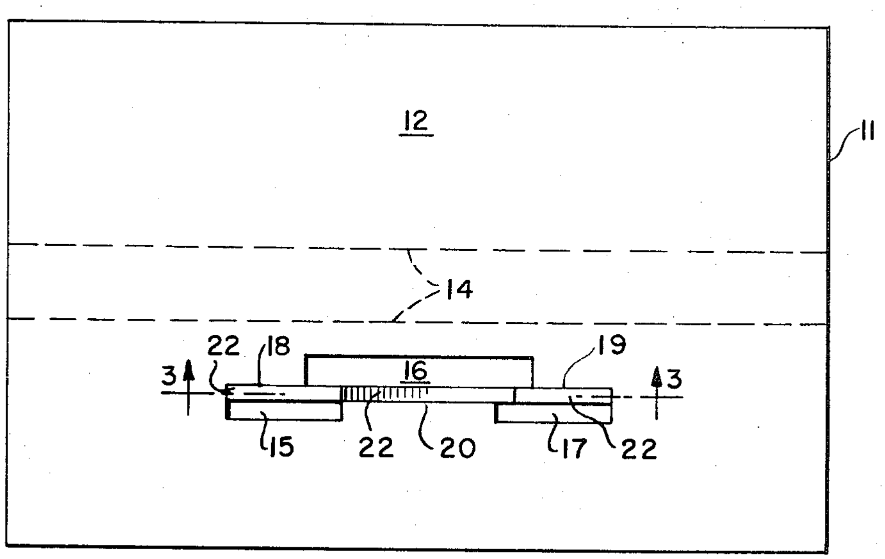
FIG. 2 is a plan view of an intermediate stage of assembly in which a flat magnetic core is inserted into the aperture.
Figure 3:
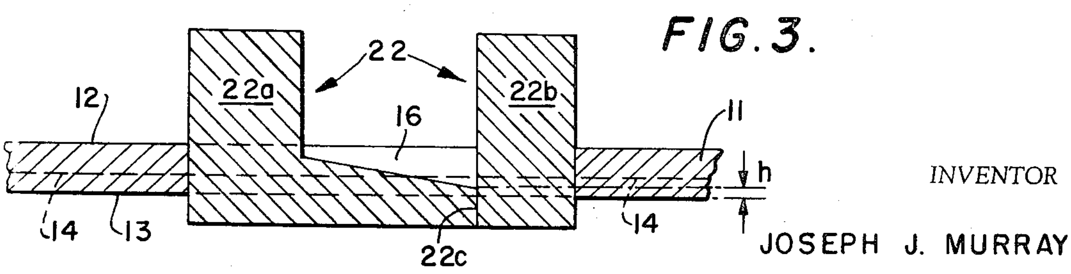
FIG. 3 is a cross-sectional view of the U-shaped core in the slider taken along lines 3—3 of FIG. 2.

As shown in FIGS. 2 and 3, a thin, flat magnetic core 22, typically ferrite, is inserted between sidewalls 18, 19 and 20. The sidewalls 18 and 19 contact the core 22 at its ends on one side. The sidewall 20 contacts the core 22 at its middle on the other side. Thus, fine positioning of the core 22 is provided solely by the contact of the sidewalls 18, 19 and 20 and the length, *l*, of the aperture 10.

The core 22, as viewed in FIG. 3, includes a generally L-shaped portion 22*a* and a bar or I-shaped portion 22*b*. The core portions 22*a* and 22*b* are cemented together with glass to form the U-shaped core 22. A narrow transducing gap 22*c* is formed by the cemented junction of portions 22*a* and 22*b*. The height, *h*, of the gap 22*c* in the head assembly is termed "throat height" and is a critical dimension in determining the magnetic response of the core 17. The legs of the U-shaped core 22 extend through upper surface 12, and the base, including the core gap 22*c*, extends somewhat beyond the bearing surface 13.

Figure 4:
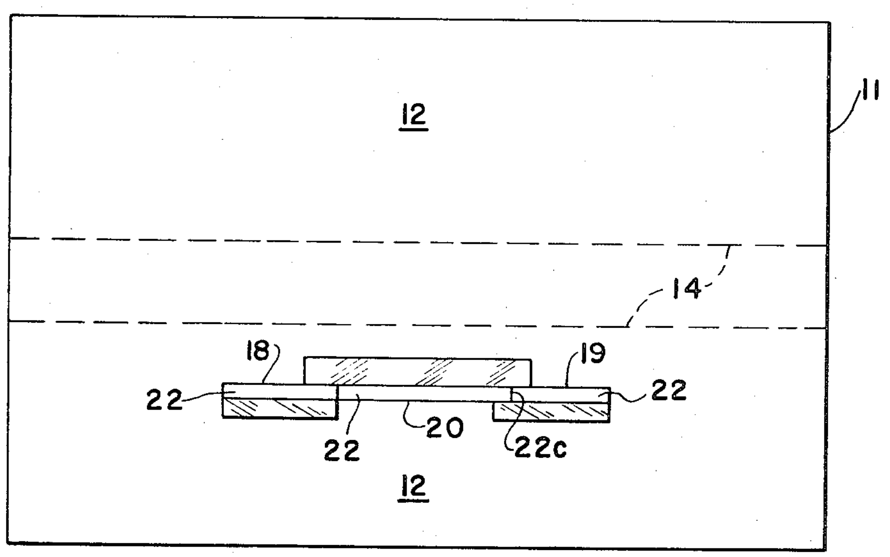
FIG. 4 is a plan view of the magnetic head assembly after the remaining vacant portions of the slider aperture have been filled with a transparent bonding material.

Since the aperture 10 is not completely filled by the core 22, vacant portions remain in slider 11 as shown in FIG. 2. Side portions of the core 22, not contacted by the sidewalls 18, 19 and 20, are exposed in these vacant portions. To seal the core 22 rigidly in the slider 11, these vacant portions are filled with a bonding composition. Glass is preferred because of its transparency and compatible thermal expansion coefficient. The preferred technique is to fill the remaining vacant portions of the aperture 10 with powdered glass or glass bars having a melting point below that of the glass in the core gap 22*c*. The entire assembly is then heated to a temperature between the two glass melting points, at which point the sealing glass melts and flows to fill the formerly vacant portions of the aperture 10. After cooling, the glass solidifies bonding the core 22 in place, as shown in FIG. 4.

Figure 5:
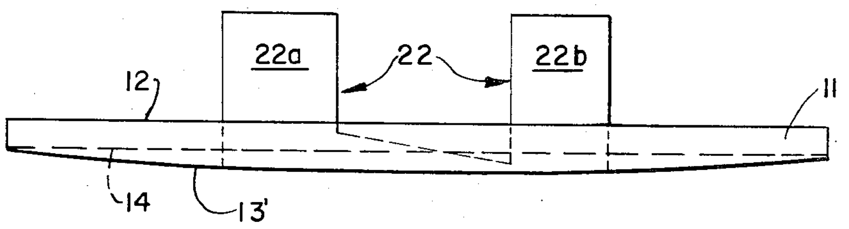
FIG. 5 is a side view of the head assembly of FIG. 4 after lapping.

To complete the assembly, the portion of the core 22 extending beyond the bearing surface 13 (FIG. 3) is removed. The bearing surface is given a convex aerodynamic contour 13' by abrasive grinding or lapping, as shown in FIG. 5. In the lapping process portions of the core 22 and adjacent bearing surface are removed to obtain the desired throat height. If a nontransparent bonding material has been used in the aperture 10, the throat height, *h*, can be determined by direct measurement of the distance from a selected point on the bearing surface 13' to the top of the core legs formed by the portions 22*a* and 22*b* which extend above the slider's upper surface 12. However, if the bonding material is transparent, like the preferred glass, the throat height, *h*, can be determined optically.

Figure 6:
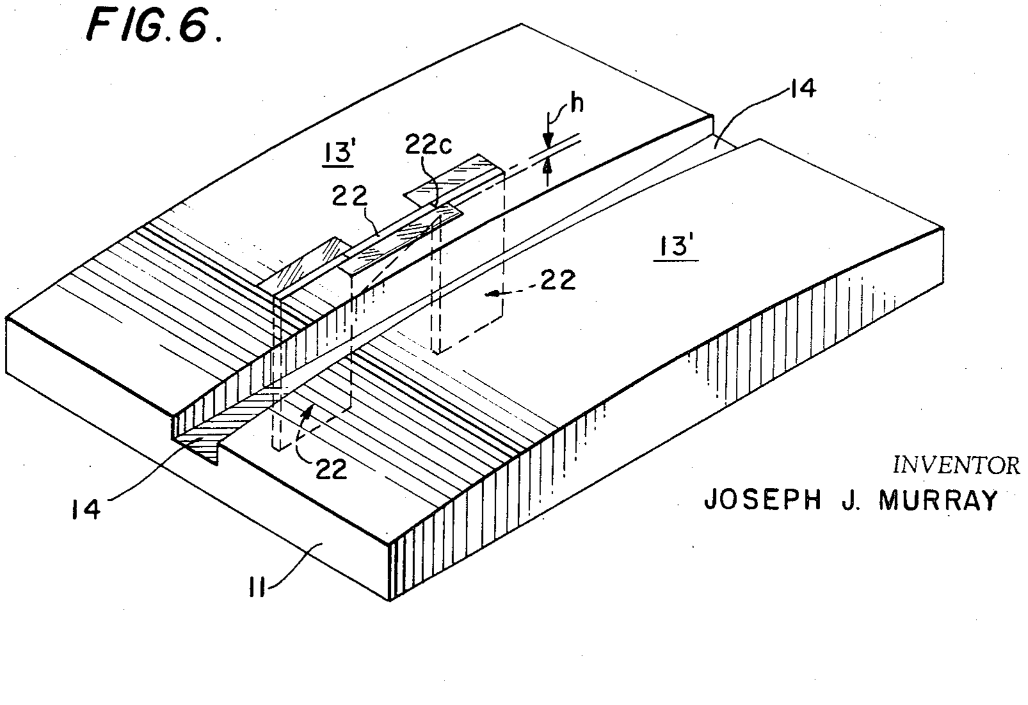
FIG. 6 is an isometric view of the bearing surface of the head assembly illustrating the visibility of the transducing gap.

The finished bearing surface 13' is shown in FIG. 6, affording a view of the aerodynamic slot 14. The slot 14 is a linear recess parallel to the core 22 and located approximately in the middle of the bearing surface 13'. The slot 14 maintains equal air pressure on either side of the bearing surface 13' when the assembly is used, for example, in a magnetic disc system.

By tilting the assembly slightly, the core gap 22*c* can be seen through one of the glass filled portions of the aperture 10. The throat height, *h*, of the gap can be derived trigonometrically using a measuring microscope and noting the angle at which the assembly is tilted.

The ends of the legs of the core 22 above the slider's upper surface 12 are, in practice, bridged by a magnetic backbar or sidebar (not shown) supported by the arm to which the assembly is attached. The backbar carries the read and write coil wires and completes the magnetic circuit for the core 22.

One of the advantages of the invention is that a higher yield is attainable in mass production since it is significantly easier to make a relatively wide aperture, like aperture 10 in FIG. 1, than one having narrowly spaced sidewalls defining the core slot. Another advantage of the invention is that while the core is positioned solely by the sidewalls, the ability to view the core gap can be preserved by using a transparent bonding material in the vacant portions of the aperture.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. A method of positioning a flat magnetic core with a transducing gap in a base to form a magnetic head assembly, comprising the steps of forming an irregularly shaped elongated aperture through the base having nonfacing parallel sidewalls which define a slot within said aperture with the same width as the core, said aperture being wider than said slot at said nonfacing sidewalls, inserting the core into said slot between said sidewalls, and filling the remaining vacant portions of said aperture with a bonding material.

2. The method of claim 1, further comprising the step of removing a portion of said base and said core to reduce said transducing gap to an optimum height.

3. The method of claim 1, wherein said bonding material is transparent, and further comprising the step of removing portions of said base and core until said transducing gap is reduced to a predetermined critical height as determined by optically viewing said transducing gap through said transparent bonding material.

4. The method of claim 3, wherein said transparent bonding material is glass.

5. The method of claim 4, wherein the step of filling said vacant portions with glass includes the steps of placing glass in said vacant portions and then heating the assembly to the melting point of the glass so that it flows into sealing contact with the core and base.

6. The method of claim 3, wherein the slot into which the core is inserted is defined by three sidewalls of the aperture formed in the base, two of the sidewalls being spaced from each other and lying in a first plane, the other sidewall being located between the two coplanar sidewalls and lying in a second plane parallel to the first plane and spaced therefrom by a distance equal to the width of the core.

7. A method of positioning a flat magnetic core with a transducing gap in a base to form a magnetic head assembly, comprising the steps of forming an irregularly shaped aperture through the base having sidewalls lying in two parallel planes spaced from each other by the width of the core and having at least one wider portion in which the width of said aperture in a direction normal to said planes is greater than the width of the core, inserting the core between said sidewalls such that the transducing gap is located in said wider portion of said aperture, filling the remaining vacant portions of said aperture with a transparent bonding material to fix the core in the base, and machining the base until the transducing gap is reduced to a predetermined critical height as determined by viewing the gap through said transparent bonding material.

8. A magnetic head assembly, comprising a flat magnetic core forming a transducing gap of critical height, and a base with an irregularly shaped aperture formed therethrough having a plurality of nonfacing sidewalls lying in two parallel planes spaced from each other by a distance equal to the thickness of said core, said aperture being wider than said core at said nonfacing sidewalls, said core being fixed to said base between said sidewalls in the slot defined thereby, with said gap in said slot.

9. The assembly of claim 8, wherein the portions of said aperture not occupied by said core are filled with a bonding material to fix said core to said base.

10. The assembly of claim 9, wherein said bonding material is transparent.

11. The assembly of claim 10, wherein said gap is visible through a portion of said aperture filled with said transparent bonding material.

12. The assembly of claim 10, wherein said transparent bonding material is glass.

13. The assembly of claim 8, wherein said aperture has two spaced sidewalls in one plane contacting said core at its ends on one side and another sidewall located between the two coplanar sidewalls in the other plane contacting said core at its middle on the other side.

* * * * *